Sept. 20, 1960   J. A. V. TURCK, JR   2,953,195
CUSHIONS
Filed Sept. 26, 1957
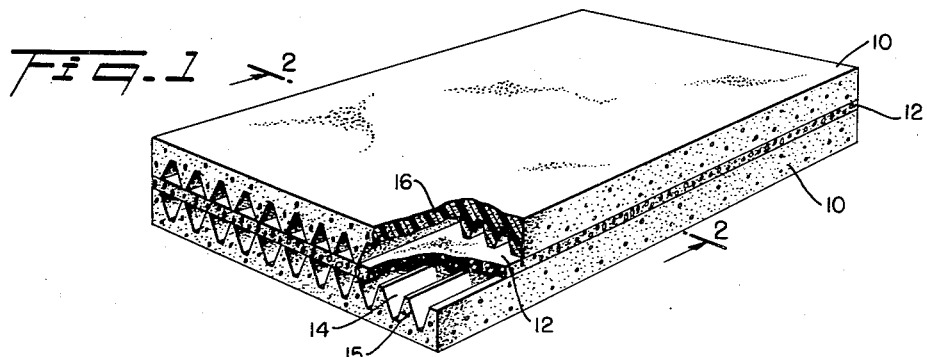
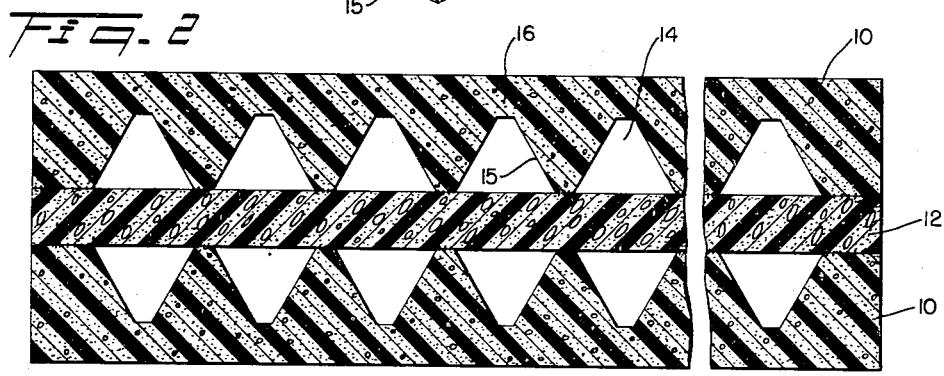
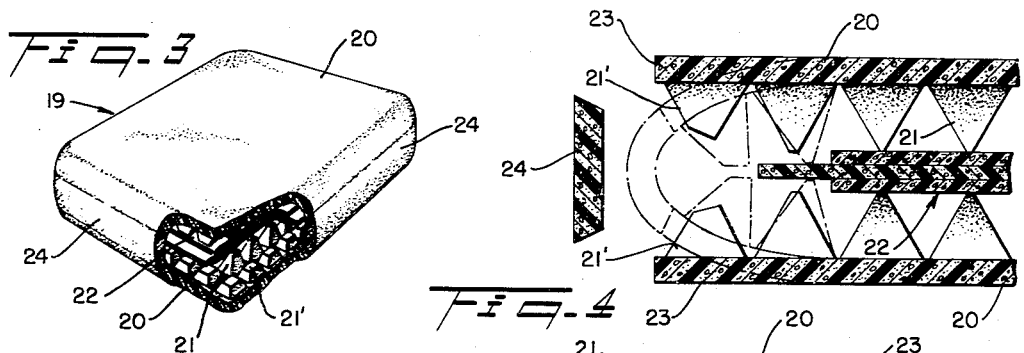
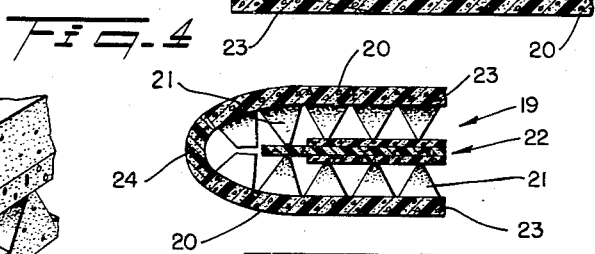
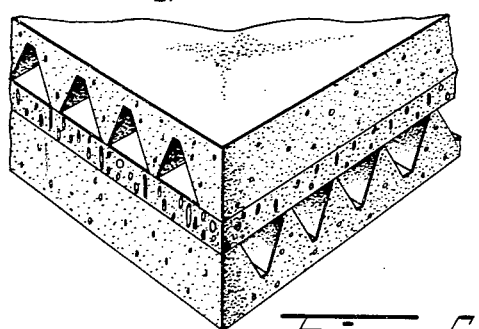
INVENTOR.
JOSEPH A. V. TURCK Jr.
BY
Bauer & Seymour
ATTORNEYS

United States Patent Office 2,953,195
Patented Sept. 20, 1960

2,953,195

CUSHIONS

Joseph A. V. Turck, Jr., Clearfield, Pa., assignor to Curtiss-Wright Corporation, a corporation of Delaware Filed Sept. 26, 1957, Ser. No. 686,335

1 Claim. (Cl. 155—179)

This invention relates to cushions and more particularly to the filler or interior support structures of cushions adapted for use, among other things, as parts of or accessories to furniture, including the seats, backs and arms of chairs, benches, couches and the like, as pillows and mattresses for beds and berths of all kinds, and as seats in aircraft, automobiles, railroad cars and the like.

Others have heretofore designed cushions embodying one or several integral bodies of latex foam or foam rubber to replace metal springs and the many types of non-resilient filling materials, such as feathers, cotton batting, horsehair, kapok and many others. These foam rubber cushions have been found to possess several disadvantages among which are the fact that the same are quite heavy when made of sufficient thickness to provide a satisfactorily comfortable cushion, the fact that they are uncomfortably hot particularly during warm weather, and the fact that the resilient characteristics thereof are such that a compressed cushion gives one an uncomfortable feeling of springiness or fightback.

These disadvantages have been overcome in cushions heretofore provided wherein the filler consists of one or several integral bodies of plastic foam which has many of the desirable attributes of foam rubber. To render plastic foam, such as polyurethane foam or its equivalent more suitable for the purpose, it has been proposed to cut grooves, recesses and the like in sheets or slabs thereof to advantageously improve the load bearing properties thereof.

An object of this invention is to provide a novelly constructed cushion embodying a small number of integral bodies of resilient material, such as foamed plastic or foam rubber.

Another object of the invention is to provide in a cushion a novel combination of specially shaped integral bodies of light weight resilient material.

A further object is to provide a novel cushion construction which has load-bearing characteristics that are superior to similar types of cushions heretofore known.

Another object is to provide a cushion of the above character which is novelly constructed to provide a desirable curved or streamlined contour while maintaining desirable load-bearing characteristics throughout.

A still further object is to provide a novel foamed plastic or foam rubber cushion which is reversible without changing the load-bearing characteristics or comfort thereof.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Fig. 1 is an isometric view, with parts broken away, showing a mattress embodying one form of the present invention;

Fig. 2 is a sectional view of the cushion of Fig. 1 on an enlarged scale, the section being taken in the plane of line 2—2 of Fig. 1;

Fig. 3 is an isometric view, with parts broken away, showing a chair cushion embodying another form of the invention;

Figs. 4 and 5 are similar sectional views of an edge portion of the cushion of Fig. 3, showing the parts thereof partially and wholly assembled, respectively; and, Fig. 6 is an isometric view of a portion of a cushion embodying still another modification of the invention.

In Figs. 1 and 2 one embodiment of the invention is shown in the form of a mattress comprising identical upper and lower layers or pads 10, 10 and a central layer or core 12. This construction may, of course, be used for types of cushions other than mattresses. For a purpose to appear hereinafter each of the surface layers or pads 10 has a series of grooves 14 cut in the face thereof adjacent core 12, the grooves in one pad being directly opposite corresponding grooves in the other pad. Accordingly, each of the ribs 15 formed by the cutting of the grooves on one surface pad 10 contacts the core 12 directly opposite and in alignment with a rib 15 on the other of pads 10. Thus, a load or force applied to a rib 15 through the web of the upper pad 10 will be transmitted through core 12 directly to a rib 15 on the lower pad. Thus, upon the initial application of a load to the assembled cushion, the initial deformation consists in the compression of the thinnest edges of ribs 15, thereby providing a relatively soft cushion effect. As the full effect of the load is impressed upon the cushion, the portions thereof having a greater transverse cross section begin to compress and provide a desired firmness and stability which is essential to comfort.

The adjacent marginal surfaces of pads 10 are adhesively secured or heat sealed to the opposed marginal surfaces of core 12, and the crowns or peaks of ribs 15 are also securely adhered to the core to form a novel relatively unitary cushion construction. The required adherence may be obtained with a suitable adhesive or by rendering one of the surfaces tacky by the application of heat in a known manner and thereafter pressing the parts together.

In order to prevent excessive sidewise buckling or tilting of ribs 15 when a load is applied to the cushion, the angle between the vertical and the inclined side walls of grooves 14 should not be appreciably less than about 20 degrees. The thickness of web 16, that is, the thickness of the uncut portion of pad 10 between the bottoms of grooves 14 and the outer surface of the pad should be sufficient to avoid any bumpy effect when the load is applied to the cushion. For a given polyurethane foam formulation, which has a load-deflection of about 0.5 p.s.i./25%, the ratio of the groove depth and the web thickness to the pitch, i.e., the distance between the corresponding parts of adjacent grooves or ribs, should be about 0.55 and 0.25, respectively, for the above described groove-on-groove construction to provide firm support of the type desired in a mattress, bench cushion, office chair or the like.

A relatively firm foam formulation having a load-deflection of about .5 p.s.i./25% is used for pads 10 and a softer foam having a load-deflection of about 0.35 p.s.i./25% is used for core 12. The latter serves as a dimension stabilizer when adhered to the pads 10 as above described and provides a tension to pull the narrow sections in ribs 15 back to vertical position when the same are tilted or bent sideways. The core also serves to correct inadvertent deviations from perfect matching of the ribs of the two pads 10 when the cushion is assembled. The core 12 may, of course, be laminated from two or more layers of foamed material, and in some cushions it may be desirable to adhesively secure a layer of fabric to one or both surfaces thereof. Some deviation from the above-mentioned load-deflection requirements is permitted depending upon the firmness or softness desired.

The firmness or softness of a cushion made as above described from any given plastic foam formulation may be varied by variations in the grooving of the inner surfaces of the load-bearing pads. For example, in a soft parlor seat cushion 19, as illustrated in Figs. 3 to 5, desired softness is attained by cross grooving each of the surface pads 20, 20 to form a series of pyramids or cone-like peaks 21. In the assembled cushion, a core 22 is interposed between pads 20 and the peaks or pyramids 21 of one pad are in alignment with and oppose the pyramids or peaks on the other pad. As in the embodiment first described, the crowns of the peaks are adhesively secured to the surfaces of core 22.

The grooving or streamlining of the peripheral edges of cushion 19 for improved appearance and comfort, while maintaining a suitable consistency in the load-bearing characteristics at the crown and edges thereof, is attained by a novel construction. The peripheral row of pyramids or cone-like peaks 21' are trimmed down or reduced in height and the peripheral portion of core 22 is tapered from both sides. The tapered effect may be attained by trimming a solid core member or as illustrated, by making the core of several laminae, the center or intermediate ones being of larger area than the outer ones. The marginal portions of pads 20, 20 extend beyond the periphery of the core and are bent inwardly toward the core as permitted by the tapered margin of the latter. The edges of the webs 23 are then adhesively secured to the suitably tapered edges of a strip 24 of foamed material which may be and preferably is of the same formulation as pads 20. The strip 24 or its equivalent extends entirely around the cushion and the ends thereof are brought together and adhesively secured to each other to make a closed cushion construction.

In cushions of the type last described for parlor use, the ratios of the groove depth and the web thickness to the pitch or spacing of the peaks 21 should be about 0.7 and 0.3, respectively. When this construction is used for pillows, a somewhat softer foam having a depression-deflection of about 0.3 p.s.i./25% is used, and the above-mentioned ratios should be about 0.9 and 0.4, respectively, for head comfort softness. Foam having a median hysteresis constant between that for foam rubber and that for really stiff plastic foams should be used to avoid the objectionable "fight-back" which is characteristic of foam rubber pillows heretofore provided.

A third modification of the invention adaptable to a variety of types of cushions is illustrated in Fig. 6. This modification as shown is the same as the embodiment of Fig. 1 except that one of the grooved pads is rotated through 90 degrees. Thus, the grooves in one surface pad extend at right angles to the grooves in the other pad. A load applied to one pad is transmitted through the ribs thereon and the soft foam core to spaced points along the ribs of the other pad. An effect similar to that of the pyramid or cone arrangement of Fig. 3 is partially attained in this manner.

In the novel cushion construction herein described, best results have thus far been obtained by utilizing a core construction of light weight plastic foam having a density of about 1.5 to 2.0 pounds per cubic foot and pores of irregular size ranging from about .005 inch to .5 inch in diameter. The optimum bonding between the core and the small pore foam used in the load-bearing parts is thus attained together with excellent ventilation, which is a highly desirable feature in cushion construction. The weight of a plastic foam cushion of the above type is only about one-third of the weight of prior known comparable cushions made of foam rubber.

There is thus provided a novel cushion construction which is extremely versatile and may be embodied in cushions for a variety of uses to satisfy a wide variety of tastes and requirements in different types of furniture and the like. These cushions are of light weight and are of substantially unitary construction so that the same maintain their initial shape and appearance throughout a long and satisfactory lifetime of hard usage.

Although only a limited number of embodiments or modifications of the invention are illustrated in the drawings and described in detail in the foregoing specification, it is to be expressly understood that the invention is not limited thereto. For example, the grooves 14 and ribs 15 may be given a somewhat different shape or contour, and the pyramid shaped peaks 21 of the second embodiment may be cone-like or other similar suitable shape. Various other changes which will now be apparent to those skilled in the art may also be made without departing from the spirit and scope of the invention.

What is claimed is:

A cushion comprising three superposed layers of plastic foam or the like, the two outer layers having the inner surfaces thereof cross-grooved to form a web portion and a plurality of projections from said web in a predetermined pattern, the peripheral row of projections being of a substantially less height than the rest of the projections, the web portions of the outer layers and the peripheral row of projections thereon extending beyond the periphery of the center layer, the center layer having a tapering marginal portion, the peaks of all but the peripheral row of projections being adhered to the surfaces of the center layer, and the peripheral margins of the web portions of said outer layers being bent toward each other whereby the peaks of the peripheral rows of projections are substantially in contact with each other, and a strip of plastic foam or the like interposed between and having its edges adhered to the peripheral edges of said web portions.

References Cited in the file of this patent

UNITED STATES PATENTS

| | | |
|---|---|---|
| 2,619,659 | Futternecht | Dec. 2, 1952 |
| 2,836,228 | Dahle | May 27, 1958 |

FOREIGN PATENTS

| | | |
|---|---|---|
| 683,754 | Great Britain | Dec. 3, 1952 |